US012558863B2

(12) United States Patent
Ruhland et al.

(10) Patent No.: US 12,558,863 B2
(45) Date of Patent: Feb. 24, 2026

(54) ARRANGEMENT FOR A CORRUGATOR

(71) Applicant: BHS Corrugated Maschinen- und Anlagenbau GmbH, Weiherhammer (DE)

(72) Inventors: Karl Ruhland, Pfreimd (DE); Maximilian Mark, Tirschenreuth (DE)

(73) Assignee: BHS CORRUGATED MASCHINEN—UND ANLAGENBAU GMBH, Weiherhammer (DE)

( * ) Notice: Subject to any disclaimer, the term of this patent is extended or adjusted under 35 U.S.C. 154(b) by 0 days.

(21) Appl. No.: 18/692,393

(22) PCT Filed: Oct. 25, 2022

(86) PCT No.: PCT/EP2022/079734
§ 371 (c)(1),
(2) Date: Mar. 15, 2024

(87) PCT Pub. No.: WO2023/072910
PCT Pub. Date: May 4, 2023

(65) Prior Publication Data

US 2024/0424759 A1 Dec. 26, 2024

(30) Foreign Application Priority Data

Oct. 29, 2021 (DE) ..................... 10 2021 212 245.0

(51) Int. Cl.
*B31F 1/28* (2006.01)
*B41J 3/44* (2006.01)
(Continued)

(52) U.S. Cl.
CPC .......... *B31F 1/2827* (2013.01); *B31F 1/2836* (2013.01); *B41J 3/44* (2013.01);
(Continued)

(58) Field of Classification Search
CPC ...... B31F 1/2827; B31F 1/2836; B32B 37/12; B32B 38/0004; B32B 38/145; B32B 39/00
See application file for complete search history.

(56) References Cited

U.S. PATENT DOCUMENTS 4,369,905 A * 1/1983 Tokuno ................. B31F 1/2836 226/17
11,234,901 B2 * 2/2022 Apell ...................... G07F 11/42
(Continued)

FOREIGN PATENT DOCUMENTS

DE 4426228 A1 1/1996
DE 102009014477 A1 9/2010
(Continued)

OTHER PUBLICATIONS

Stiefenhofer Peter, "Ohne Fehl und Tadel" QZ Qualität und Zuverlässigkeit Jahrgang 63 (2018) 03, Internet, Nov. 27, 2019 (Nov. 27, 2019), pp. 50-52, Retrieved from the Internet: https://roptec.com/wp-content/uploads/2018/03/QZ_3_2018_Stemmer-Roptec-Rollenpr%C3%BCfung.pdf [retrieved on Feb. 7, 2023] XP093021732 p. 50-p. 52.

*Primary Examiner* — Andrew M Tecco
*Assistant Examiner* — Nicholas E Igbokwe
(74) *Attorney, Agent, or Firm* — McGlew and Tuttle, P.C.

(57) ABSTRACT

An arrangement for a corrugator for producing corrugated cardboard comprises a material web delivery device for delivering a material web and an edge cutting device, which is arranged downstream of the material web delivery device in a transport direction of the material web and has at least one edge cutting apparatus for edge-cutting the material web, and a digital printing device, which is arranged downstream of the edge cutting device in the transport direction of the material web for printing on the material web.

21 Claims, 9 Drawing Sheets

(51) Int. Cl.
*B41J 11/00* (2006.01)
*B41J 11/68* (2006.01)
*B41J 15/04* (2006.01)

(52) U.S. Cl.
CPC ............ *B41J 11/0095* (2013.01); *B41J 11/68* (2013.01); *B41J 15/046* (2013.01); *B31F 1/2818* (2013.01)

(56) References Cited

U.S. PATENT DOCUMENTS

| | | | | |
|---|---|---|---|---|
| 2003/0000988 | A1* | 1/2003 | Ruhland | B31F 1/2836 271/227 |
| 2019/0061191 | A1* | 2/2019 | Sanz Ananos | B26D 1/185 |
| 2019/0070742 | A1* | 3/2019 | Ruhland | B26D 1/605 |
| 2019/0084288 | A1* | 3/2019 | Städele | B32B 38/0004 |
| 2020/0394489 | A1* | 12/2020 | Adam | G06K 19/07728 |

FOREIGN PATENT DOCUMENTS

| | | | |
|---|---|---|---|
| DE | 102017216718 | A1 | 3/2019 |
| DE | 102018207245 | A1 | 11/2019 |
| DE | 102019201601 | A1 | 8/2020 |
| EP | 0692370 | A1 | 1/1996 |
| EP | 1035057 | A2 | 9/2000 |
| EP | 1990148 | A1 | 11/2008 |
| EP | 3453501 | A1 | 3/2019 |
| EP | 3459725 | A2 | 3/2019 |
| WO | 2010054910 | A2 | 5/2010 |
| WO | 2016174221 | A1 | 11/2016 |
| WO | 2016174225 | A2 | 11/2016 |

* cited by examiner

ARRANGEMENT FOR A CORRUGATOR

CROSS-REFERENCES TO RELATED APPLICATIONS

This application claims the priority, under 35 U.S.C. § 119, of German Patent Application, Serial No. DE 10 2021 212 245.0, filed Oct. 29, 2021, the content of which is incorporated herein by reference in its entirety as if fully set forth herein.

FIELD OF THE INVENTION

The invention relates to an arrangement for a corrugator for producing corrugated cardboard. Furthermore, the invention is directed to a complete system comprising at least one arrangement of this type.

BACKGROUND OF THE INVENTION

In digital printing, such as inkjet printing, in order to achieve a high print quality and to allow a high transport speed of the material web to be printed on, it is necessary that print heads have an extremely small distance, usually between 1 mm and 2 mm, to the material web to be printed on. If a print head touches the material web to be printed on, this can lead to damage to the print head and/or the material web to be printed on, which is undesirable.

SUMMARY OF THE INVENTION

It is therefore an object of the invention to provide an arrangement for a corrugator which overcomes the issues of the prior art. In particular, the arrangement should be capable of reducing or preventing damage to the digital printing device and/or to the material web to be printed on, in particular also at high transport speeds of the material web to be printed on and/or high print quality. A corresponding complete system should also be provided.

This object is achieved in a non-obvious manner by an arrangement for a corrugator for producing corrugated cardboard, comprising a material web delivery device for delivering a material web, comprising an edge cutting device, which is arranged downstream of the material web delivery device in a transport direction of the material web and has at least one edge cutting apparatus for edge-cutting the material web, and comprising a digital printing device, which is arranged downstream of the edge cutting device in the transport direction of the material web for printing on the material web, and an overall system comprising at least one arrangement according to the invention, wherein the at least one arrangement is arranged upstream of a corrugator or is a component of a corrugator. In accordance with the invention, it has been recognized that damage to the digital printing device or to at least one print head thereof can frequently be traced back to at least one edge (region) of the material web to be printed on, in particular to at least one print head. Such a deformed edge (region), which occurs, for example, during storage and/or transport of the material web, also repeatedly leads to further damage to the material web. Corresponding damage to the digital printing device or the material web to be printed on can be reliably avoided or reduced by cutting or trimming the edges of the material web to be printed on prior to or upstream of the printing of the material web. If necessary, the material web is guided through the digital printing device with at least one new or newly created, in particular proper, edge (region).

The at least one edge cutting apparatus is capable of cutting or separating at least one (deformed) edge region or edge strip of the material web adjoining at least one material web margin/edge, in particular during transport of the same. The at least one edge region can preferably be diverted or discharged. The at least one edge cutting apparatus is preferably designed as a longitudinal edge cutting apparatus, which is capable of cutting the material web at a distance from its at least one longitudinal edge. It is expedient if the at least one edge cutting apparatus comprises at least one knife, such as a cutting knife, stationary knife, non-driven knife or circular knife.

Preferably, the at least one edge cutting apparatus is adjustable in a width or transverse direction of the material web, i.e. perpendicular to the transport direction of the material web. It is expedient if the at least one edge cutting apparatus is adjustable accordingly in the width direction of the material web by at least one adjustment means, such as an adjustment motor, adjustment drive or the like. Said adjustment means is of an electric, pneumatic or hydraulic type, for example. Such an adjustment of the at least one edge cutting apparatus takes place, for example, upon engagement in the material web or while arranged at a distance. An adaptation to material webs of different widths is thus possible simply and reliably.

Favorably, the at least one edge cutting apparatus has at least one counter body, which is designed, for example, as a brush roller or also in a cutting manner. For example, a counter body is assigned to each knife. Alternatively, for example, several knives share a counter body.

The material web delivery device is designed, for example, as a material web unwinding device, such as a material web splicing device for forming an endless material web.

It is expedient for the material web to be made of cardboard, paper or the like. Favorably, it is single-layered. It is advantageous if the material web is arranged on the outside of the finished corrugated cardboard. The material web is favorably a laminating web. It is preferably endless. The material web is or remains preferably a smooth, uncorrugated web. The finished corrugated cardboard (web) is multi-layered, such as three-layered, five-layered or seven-layered.

The digital printing device is preferably designed as an inkjet printing device and, in particular, is capable of ejecting color or ink onto the material web for printing. It is capable of producing at least one imprint on the material web, which comprises, for example, a letter, a number, another character, a graphic and/or a photo. The at least one imprint favorably covers at least some regions of one side of the material web, which is visible from the outside of the finished corrugated cardboard or web.

The corrugator in which the at least one arrangement is arranged upstream of the corrugator or is a component of the corrugator preferably comprises at least one device for producing a respective corrugated cardboard web laminated on one side with a corrugating apparatus for forming a corrugated web. Each device for producing a corrugated cardboard web laminated on one side advantageously has a glue application apparatus for applying glue onto the corresponding corrugated cardboard web. It is expedient if each device for producing a corrugated cardboard web laminated on one side also comprises a pressing device for pressing a cover web against the associated corrugated web provided with glue in order to form a corrugated cardboard web laminated on one side. The at least one arrangement is, for example, part of a corrugator. In particular, the actual corrugator then adjoins the at least one arrangement. Alternatively, the arrangement and the corrugator are arranged at a distance from one another, such as spatially separated from each other. For example, they are arranged in different hall areas, town districts, towns, companies, sites or the like.

It is advantageous if the corrugator also comprises a device for producing a corrugated cardboard web laminated on both sides from the at least one corrugated cardboard web laminated on one side and the laminating web.

A corresponding method preferably comprises the steps delivering a material web by means of a material web delivery device, edge cutting of the material web by means of at least one edge cutting apparatus of an edge cutting device which is arranged downstream of the material web delivery device in a transport direction of the material web, and printing on the material web by means of a digital printing device, which is arranged downstream of the edge cutting device in the transport direction of the material web.

The terms "downstream", "upstream" or the like used here generally refer to the transport direction of the material web.

Further advantageous embodiments of the invention are given hereinafter.

It is expedient if the arrangement comprises at least two edge cutting apparatuses for edge-cutting the material web on both sides. This design means that damage to the digital printing device or the material web to be printed on can be reduced or avoided particularly reliably. The material web is preferably cut with the edge cutting apparatuses adjacent to opposite (longitudinal) edges of the material web. The edge cutting apparatuses are preferably constructed identically. The distance between them is preferably adjustable relative to each other.

Favorably, the arrangement comprises a pre-coating application device arranged between the material web delivery device and the digital printing device for applying a pre-coating to the material web, wherein the edge cutting device is arranged downstream of the pre-coating application device in the transport direction of the material web. The pre-coating application device enables the production of a particularly high-quality material web or corrugated cardboard. This material web is very easy to print on. It is expedient if a distance or a material web transport path between the edge cutting device and the digital printing device is as large as possible. The edge cutting device is favorably arranged adjacent to a pre-coating arrangement which includes the pre-coating application device. For example, if at least one damaged edge region of the material web is detected, at least one endangered or endangering print head can be removed from the danger zone, in particular lifted off. Empty print planning is also well possible in this manner.

It is expedient if the pre-coating application device comprises at least one pre-coating application roller, which preferably extends horizontally and perpendicularly to the transport direction of the material web there. The at least one pre-coating application roller is preferably immersed in or wetted with an applicable pre-coating agent. It is preferably in direct contact with the material web. It is expedient if at least one pre-coating drying device of the pre-coating arrangement is arranged downstream of the pre-coating application device.

Preferably, alternatively or additionally, the edge cutting device is arranged adjacent to the material web delivery device, preferably between the material web delivery device and a pre-coating application device. It is advantageous if the edge cutting device follows the material web delivery device, in particular directly or immediately. A distance or a material web transport path between the edge cutting device and the digital printing device is thus extremely large. For example, if at least one damaged edge region of the material web is detected, at least one endangered or endangering print head can be removed from the danger zone, in particular lifted off. Empty print planning is also well possible in this manner.

The edge cutting device in which the edge cutting device is capable of producing a cut which, with a line parallel to the transport direction of the material web, encloses an angle which is between 0° and 45° allows a particularly good or trouble-free material web width change. A corresponding edge-cutting of the material web at an angle to the line parallel to the transport direction permits, for example, a smooth transition during a width change or in a width change region of the material web. The risk of damage, such as tearing, to the material web or the digital printing device can thus be reduced.

The material web run correction arrangement comprising a material web run correction arrangement arranged downstream of the edge cutting device in the transport direction of the material web for correcting a run of the material web, wherein the material web run correction arrangement has at least one material web run detection apparatus and at least one material web run correction apparatus which is at least temporarily in signal connection with said material web run detection apparatus, wherein preferably the material web run correction arrangement has a material web run actuating unit which is at least temporarily in signal connection with the at least one material web run detection apparatus and material web run correction apparatus results in corrugated cardboard that is of particularly high quality. Its production is extremely economical. For example, the material web can be aligned towards a center or towards the digital printing device. It is advantageous if the at least one material web run correction apparatus comprises at least one run correction roller around which the material web is guided. The at least one run correction roller is favorably tiltable and thus adjustable relative to the material web in order to deflect the latter laterally or in its width/transverse direction, if necessary.

The material web run actuation unit described above is advantageously of an electrical or electronic type. It is expedient if it is designed as a control and/or regulation unit.

The material web detection arrangement comprising a material web detection arrangement with at least one material web detection apparatus for detecting the material web, wherein preferably the material web detection arrangement is at least temporarily in signal connection with an evaluation unit, results in a particularly efficient arrangement. It is expedient if this works without contact. The at least one material web detection apparatus is designed, for example, as a camera, sensor or the like. Preferably, multiple material web detection apparatuses are provided, which are favorably arranged at a distance from one another in the transport direction of the material web. The material web detection apparatuses are identical in their function, for example. Alternatively, they differ from one another in terms of their function.

The evaluation unit described above is favorably of an electrical or electronic type. For example, it is capable of evaluating a material web cutting pattern. In this way, a material web can be produced that is of particularly high quality. Furthermore, extremely efficient production of the same is thus possible.

The at least one material web detection apparatus which is capable of detecting at least one edge region of the material web again allows an extremely economical production of the material web or corrugated cardboard. A particularly high-quality material web or corrugated cardboard can thus be produced. For example, at least one material web detection apparatus is capable of detecting at least one (transverse) position or a course of the at least one material web edge.

The specifications given above apply essentially analogously to an arrangement in which at least one material web detection apparatus is capable of detecting a surface condition of the material web at least in some regions. For example, at least one material web detection apparatus is capable of detecting at least one surface defect, a shape deviation, protrusion, projection, unevenness or roughness of the material web. It is advantageous if both at least one material web edge region and a surface condition can be detected.

Preferably, at least one material web detection apparatus is capable of detecting shrinkage of the material web, at least in some regions. The at least one material web detection apparatus is capable of detecting the shrinkage of the material web directly or indirectly. To detect the shrinkage of the material web, for example, spaced marks are arranged on the material web in the transverse and/or longitudinal direction of the material web. Mark distances or the marks are detected, wherein mark distances are then favorably calculated. The degree of shrinkage of the material web can preferably be determined. It is useful if it is possible to check whether the edge cut in/at the corrugator still has the minimum width.

The embodiment in which at least one material web detection apparatus is arranged downstream of the edge cutting device in the transport direction of the material web allows, for example, a check as to whether the edge cutting device is carrying out a proper cutting process or whether the at least one new edge of the material web is properly formed. The at least one material web detection apparatus permits the detection of an actual state of the cut material web. Preferably, at least one cutting parameter of the edge cutting device is post-corrected if necessary. If necessary, at least one print head is removed from a danger zone in the event of a damaged edge region of the material web. Empty print planning is also well possible.

The embodiment in which at least one material web detection apparatus is arranged upstream of the edge cutting device in the transport direction of the material web enables detection of the at least one original, such as unprocessed, edge of the material web. The at least one material web detection apparatus thus allows the detection of an actual state of the material web to be cut. It is thus possible to check, for example, whether or to what extent a corresponding edge cut by the edge cutting device is necessary or expedient. Corresponding cutting parameters can thus preferably be transmitted directly or indirectly to the edge cutting device. If necessary, at least one print head is removed from a danger zone in the event of an irremovable edge region of the material web. Empty print planning is also well possible.

The design comprising at least one material web roll apparatus for storing at least one material web roll carrying the material web, wherein at least one material web detection apparatus for detecting the rolled-up material web is associated with the at least one material web roll apparatus, wherein preferably the at least one material web detection apparatus is capable of detecting at least one end face of the at least one material web roll, allows a particularly early detection of the material web, which is advantageous as explained. The material web roll apparatus is designed, for example, as a material web roll preparation apparatus or is a component of the material web delivery device. The material web roll preparation apparatus is capable, for example, to prepare the material web roll for further processing efficiently and reliably. Preparing the material web roll includes, for example, unpacking or exposing the latter, removing or destroying at least one fixation fixing a free material web section to prevent unwinding, removing at least one strapping element, removing a damaged material web section from the material web roll, producing a defined end contour or edge for further processing of the material web, attaching at least one piece of adhesive, such as splicing tape, to the material web and/or fixing an end face material web section. The at least one material web roll apparatus is preferably arranged upstream of the material web delivery device. For example, it is arranged adjacent or at a spatial distance, such as far away, such as in different hall areas, town districts, towns, companies, sites or the like, to the material web delivery device.

The detection of at least one end face of the at least one material web roll as described above allows conclusions to be drawn about the respective material web edge region of the material web, in particular about its condition. In particular, it is thus possible to detect damage, such as pressure marks, which have occurred, for example, when the material web roll is put down. It is often only necessary to cut the web on one side using the edge cutting device.

The actuation arrangement comprising an actuation arrangement which is at least temporarily in signal connection with the edge cutting device for actuating the edge cutting device is advantageously of an electrical or electronic type. It is expedient if it is designed as a control and/or regulation arrangement. It is preferably capable of emitting signals, such as control signals, and/or receiving signals, such as information signals.

The actuation arrangement in which the at least one material web detection apparatus is at least temporarily in signal connection with the actuation arrangement preferably receives, directly or indirectly, from the at least one material web detection apparatus corresponding electrical signals which relate to or characterize the material web. It is advantageous if the actuation arrangement and the material web run correction arrangement are at least temporarily, directly or indirectly, in signal communication with one another. For example, the material web run correction arrangement receives corresponding position or run information from the actuation arrangement, which relates to the material web or any necessary position/run correction thereof.

It is advantageous if the actuation arrangement transmits at least one piece of position information for at least one material web cut produced by the edge cutting device, which is inclined to the transport direction, to the digital printing device for at most partial printing of the material web in the region of the at least one inclined material web step. This arrangement is again particularly economical. Rejects or waste can be reduced. The at least one position information relates, for example, to at least one transverse position, longitudinal position, length and/or a course of the at least one inclined material web cut in relation to the material web. The actuation arrangement and digital printing device are at least temporarily, directly or indirectly, in signal communication for the transmission of the at least one piece of position information.

The cutting list which the actuation arrangement receives during operation, in particular for producing the corrugated cardboard, wherein the edge cutting device preferably is capable of pre-cutting the material web to a width corresponding to the cutting list, preferably with an overhang, preferably taking into account a shrinkage of the material web, preferably contains at least one piece of cutting information, such as longitudinal cutting information and/or cross-cutting information, which preferably relates to the finished corrugated cardboard. Preferably, a corrugator actuation arrangement, in particular a higher-level one, is connected to the actuation arrangement at least temporarily, directly or indirectly. Information can preferably be exchanged between these.

The overhang cited above is favorably between 1 mm and 50 mm, preferably between 5 mm and 40 mm. It is expedient if the pre-cutting takes place taking into account a degree of transverse and/or longitudinal shrinkage of the material web. Shrinkage of the material web occurs in particular when its temperature and/or moisture content changes. Preferably, at least one material web detection apparatus is able to detect a corresponding shrinkage of the material web, directly or indirectly. It is expedient if corresponding equalization factors are determined and used. Pre-cutting is preferably carried out in such a manner that the material web has the target width even after shrinkage. The at least one edge cutting apparatus is preferably given a maximum dimension that can be removed therefrom.

The material web roll standing surface formed by a material web winding device for winding up the material web cut at at least one edge, wherein the material web is windable by the material web winding device to form a material web roll, even with different widths over its longitudinal extent, in such a manner that a material web edge of the material web extends, in particular is aligned, at an end face of the material web roll, preferably allows the material web roll to be placed in a stable or tilt-proof position, for example in a warehouse, a transport vehicle or the like. It preferably forms a standing plane which extends favorably perpendicularly to a longitudinal or rotational axis of the material web roll. In the region of the material web roll standing surface, the adjacent material web edge is at least partially, in particular neatly, aligned.

The overall system preferably comprises a corrugator actuation arrangement and at least one cross-cutting device, wherein the corrugator actuation arrangement is capable of correspondingly actuating at least one cross-cutting device for discharging an unprinted or defective region of the material web. The cross-cutting device is preferably capable of at least partially cutting the material web, in particular with at least one other material web connected to the latter, in its transverse or width direction. The material web is preferably part of a corrugated cardboard web, in particular one that is laminated on both sides. The cross-cutting device is designed, for example, as a short cross-cutting device or cross-cutting device for complete cross-cutting of the material web. It is favorably connected, at least temporarily, directly or indirectly, to the corrugator actuation arrangement.

The embodiment comprising a control apparatus for controlling a cutting pattern and/or print image of the material web again enables particularly high-quality and economical production of corrugated cardboard. It allows, for example, a target/actual comparison. The control apparatus preferably operates without contact.

The overall system comprises, for example, a device for producing a corrugated cardboard web laminated on both sides from the material web and at least one further material web and a control apparatus assigned to the device for producing a corrugated cardboard web laminated on both sides for controlling a cutting pattern and/or print image of the material web. The control apparatus preferably comprises at least one control means which is arranged upstream of the device for producing a corrugated cardboard web laminated on both sides. Alternatively or additionally, it preferably has at least one control means which is arranged downstream of the device for producing a corrugated cardboard web laminated on both sides. The at least one further material web is preferably in each case two-layered and preferably designed as a corrugated cardboard web laminated on one side.

The overall system preferably comprises a slitting/creasing device for slitting and/or creasing a corrugated cardboard web laminated on both sides and a control apparatus associated with the slitting/creasing device for controlling a cutting pattern and/or print image of the web. The control apparatus advantageously comprises at least one control means which is arranged downstream of the slitting/creasing device.

It is expedient to make a corresponding post-correction if a faulty cutting pattern is detected.

Favorably, feedback is provided with a higher-level control system. The higher-level control system is formed, for example, by the corrugator actuation arrangement or is superordinate thereto. It is electrical or electronic in nature.

The specifications given above also relate to advantageous further embodiments of the overall system described or of a corresponding method.

In the following, a number of preferred embodiments of the invention are described by way of example with reference to the attached drawing.

DESCRIPTION OF THE PREFERRED EMBODIMENTS

Figure 1:
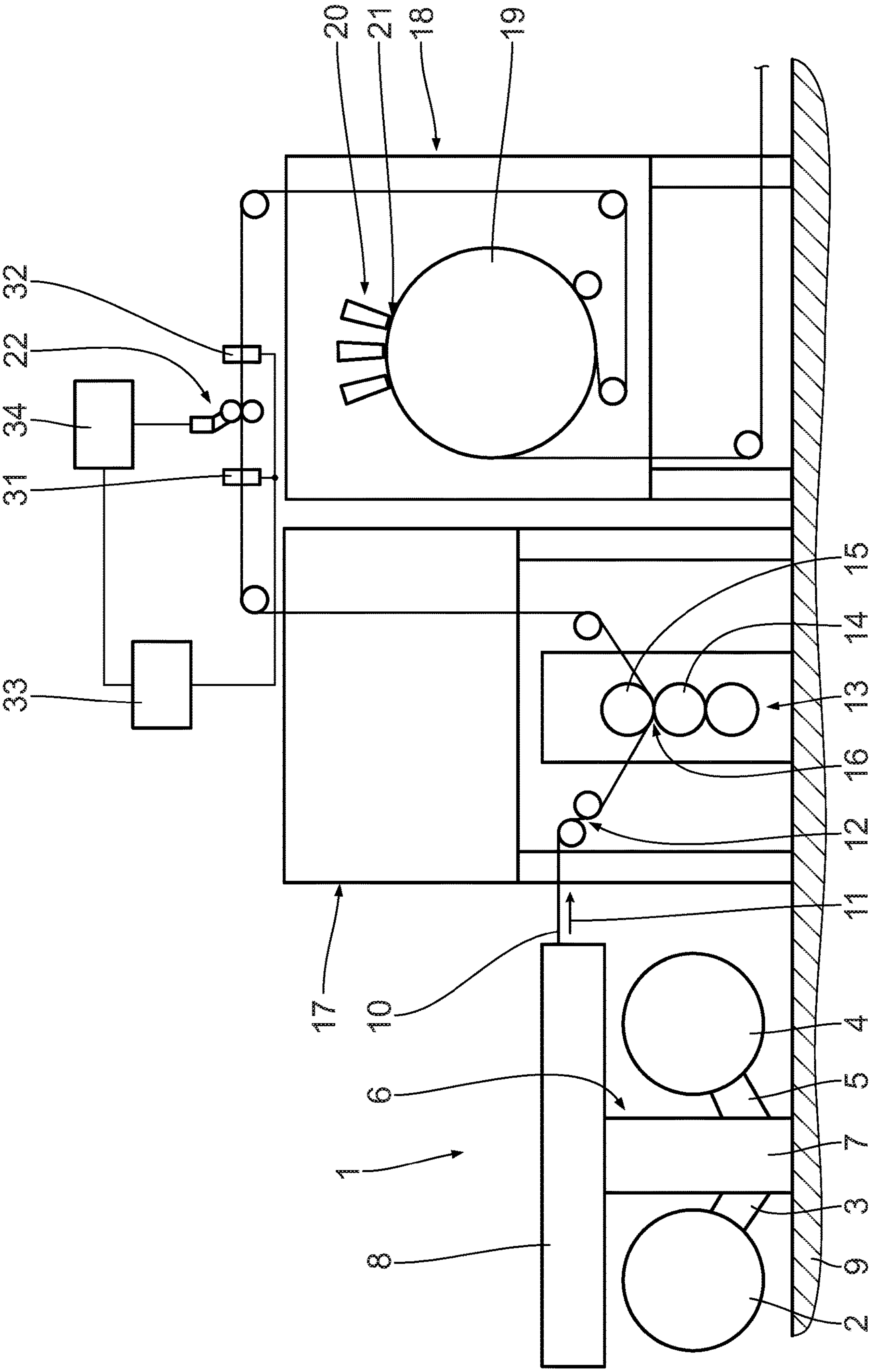
FIG. 1 shows is a schematic view of an arrangement according to the invention, in particular a printing arrangement, including the material web.
Figure 2:
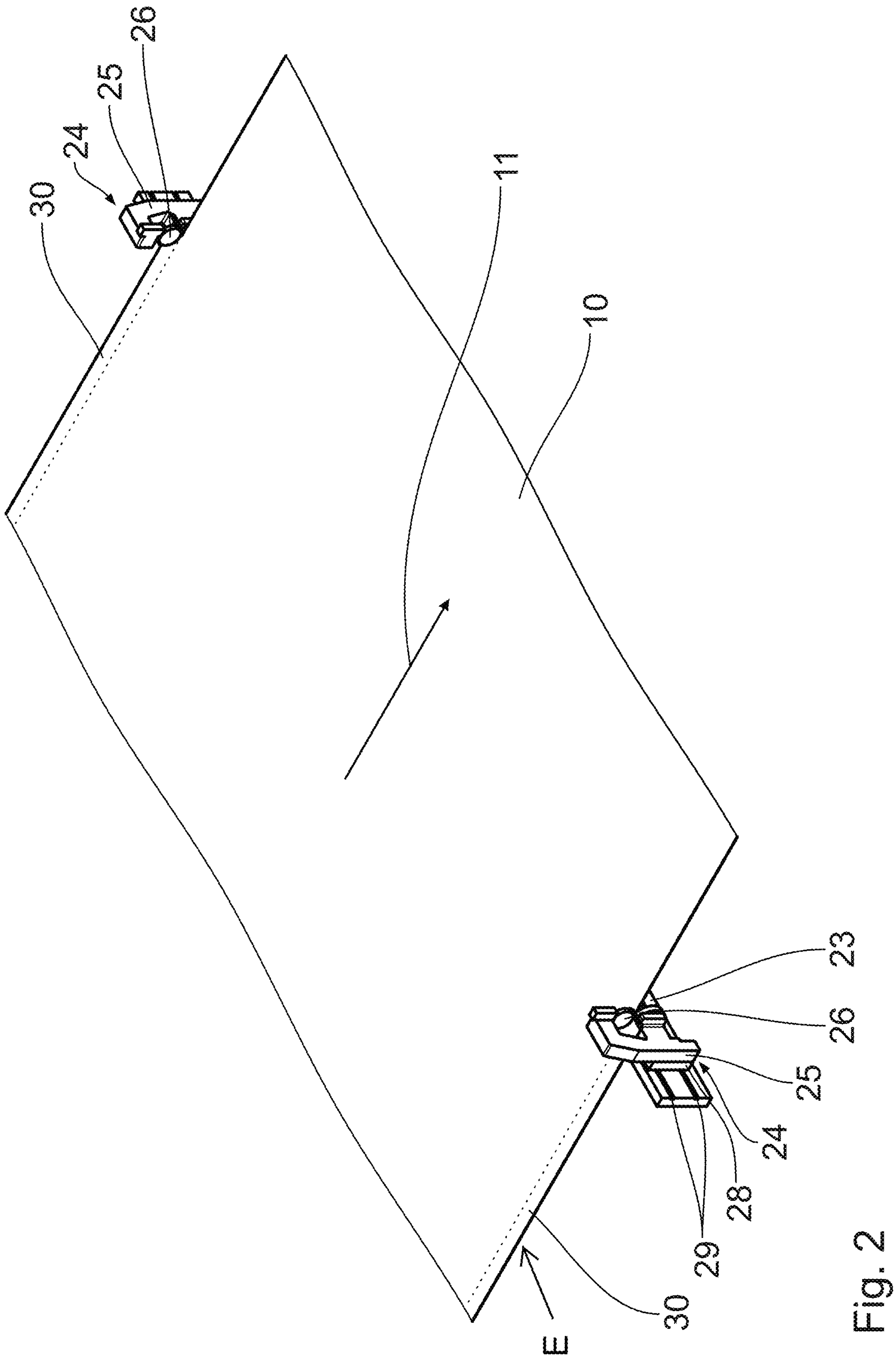
FIG. 2 shows a perspective view illustrating the edge cutting device of the arrangement shown in FIG. 1 together with the material web.
Figure 3:
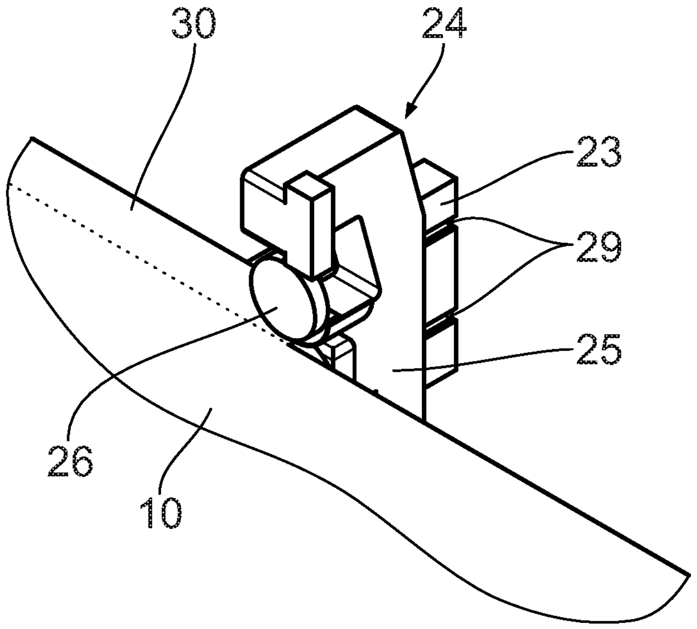
FIGS. 3, 4 shows the edge cutting apparatuses of the edge cutting device illustrated in FIG. 2 on an enlarged scale.
Figure 4:
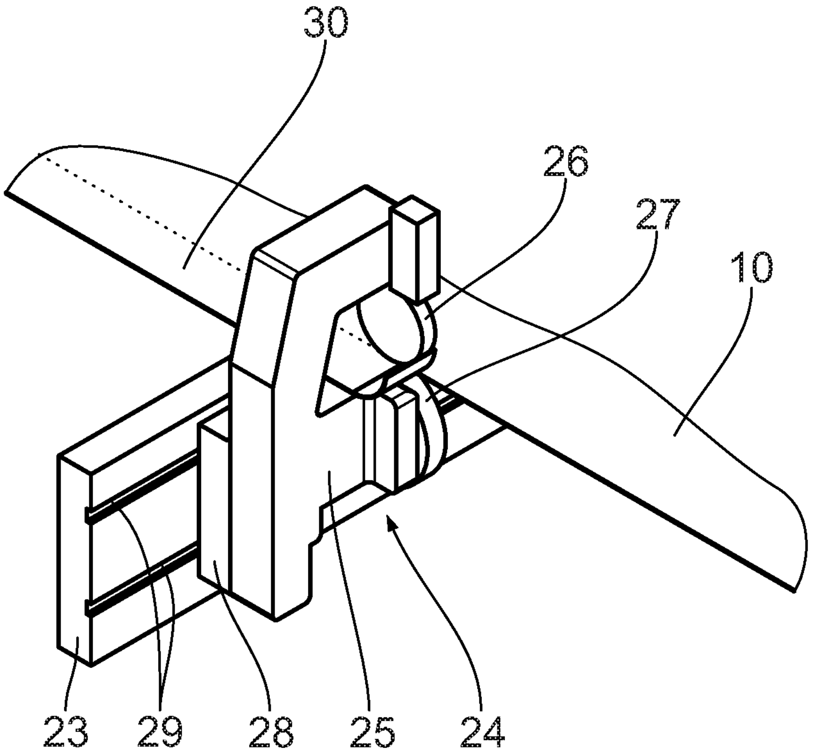
Figure 5:
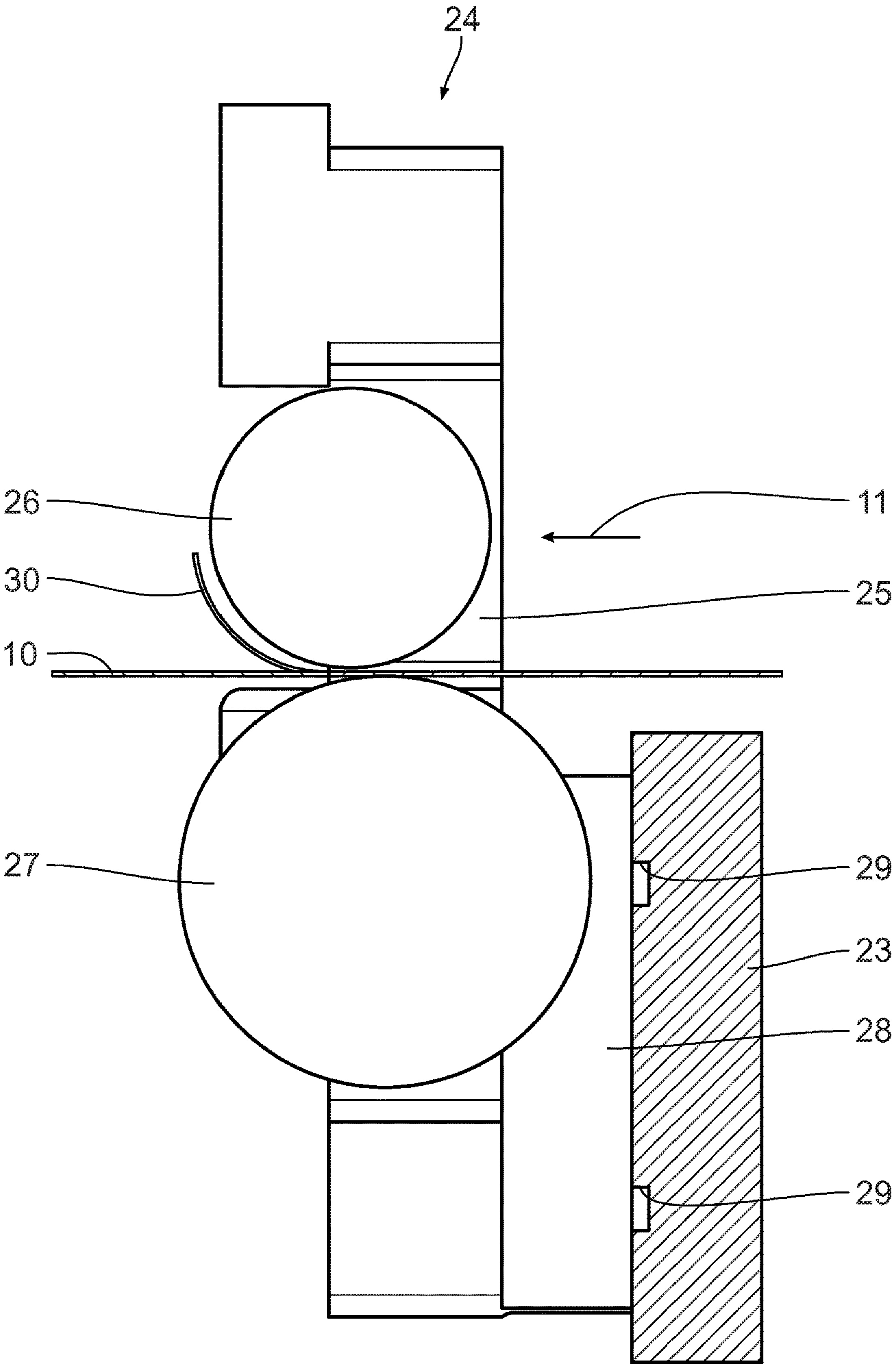
FIG. 5 shows a section through the edge cutting device and material web shown.

An arrangement as shown in FIG. 1, which is part of a corrugator or arranged upstream thereof, has a material web delivery device 1 which is designed as a material web splicing device. The material web delivery device 1 comprises a first unwinding unit 3 for unwinding a finite first material web from a first material web roll 2 and a second unwinding unit 5 for unwinding a finite second material web from a second material web roll 4. Each unwinding unit 3, 5 provides a horizontal unwinding axis. The finite material webs preferably have an identical width.

The material web delivery device 1 has a base frame 6 with a base frame stand 7 and a base frame support 8. The base frame stand 7 is fastened in/to a floor or substrate 9 and extends vertically. The base frame support 8 is arranged at the top of the base frame stand 7 and extends horizontally at a distance from the floor 9.

The first and second unwinding units 3, 5 are pivotably mounted on the base frame stand 7 and arranged opposite each other relative thereto. The finite first material web and finite second material web can be fed to a cutting and joining apparatus (not shown) of the material web delivery device 1. The cutting and joining apparatus is arranged in/on the base frame support 8. It serves to produce an endless material web 10 from the finite first and second material webs. The endless material webs are preferably bonded to each other with at least one piece of adhesive.

The endless material web 10 is transported in a transport direction 11 via a pair of deflection rollers 12 to a pre-coating application device 13. The transport direction 11 is orientated along a longitudinal extent of the endless material web 10. The pre-coating application device 13 is capable of applying a flat pre-coating (not shown) to at least one side, in particular to an outer side or print side, of the endless material web 10. For this purpose, it has a pre-coating application roller 14, which extends horizontally and perpendicularly to the transport direction 11 of the endless material web 10. The pre-coating application roller 14 receives pre-coating agent from a pre-coating agent bath (not shown), directly or indirectly, and applies the latter, preferably in a dosed manner, to the endless material web 10. Above the pre-coating application roller 14, the pre-coating application device 13 has a guide roller 15, which forms a pre-coating agent application gap 16 with the pre-coating application roller 14.

A pre-coating drying device 17 is arranged downstream of the pre-coating application device 13, which is capable of drying the endless material web 10 or the pre-coating applied thereto. The pre-coating drying device 17 has, for example, multiple pre-coating drying apparatuses or chambers that are arranged in series. It works, for example, with radiation, such as infrared, and/or heat, such as hot air.

An inkjet printing device 18 is arranged downstream of the pre-coating drying device 17, which inkjet printing device 18 prints at least one imprint on the dried endless material web 10 or pre-coating. The at least one imprint is preferably a water-based color imprint.

The inkjet printing device 18 has a central cylinder or printing cylinder 19, which extends perpendicularly to the transport direction 11 of the endless material web 10 and horizontally. Furthermore, the inkjet printing device 18 has a print head apparatus 20 or an inkjet print bar having print heads, which inkjet print bar extends at a distance in some regions around the central cylinder 19, forming a print gap 21. The endless material web 10 is largely in contact with the central cylinder 19. It is guided through the print gap 21 for printing.

The print head apparatus 20 can be lifted off the endless material web 10 or the central cylinder 19 by enlarging the print gap 21, in particular upwards in this case.

Preferably, the inkjet printing device 18 is followed by an inkjet printing and drying device (not shown), which dries the printed endless material web 10 or its at least one imprint. The inkjet printing and drying device works, for example, with radiation, such as infrared, and/or heat, such as hot air.

Favorably, the pre-coating application device 13, pre-coating drying device 17, inkjet printing device 18 and inkjet printing and drying device are part of a digital printing arrangement.

The corrugator also has at least one device for producing a corrugated cardboard web (not shown), in particular an endless corrugated cardboard web laminated on one side. Each device for producing a corrugated cardboard web laminated on one side comprises a corrugating device or a pair of corrugating rollers for producing a corrugated cardboard web. For gluing the corrugated web to a cover web, each device for producing a corrugated cardboard web laminated on one side has a glue application apparatus which applies a dosed amount of glue to the tips of the corrugation of the respective corrugated web. Each glue application apparatus has a glue application roller that receives glue, directly or indirectly, from a glue bath and applies it to the respective corrugated web. For pressing the cover web against the associated corrugated web provided with glue, each device for producing a corrugated cardboard web laminated on one side has a pressing apparatus which has, for example, at least one pressure roller and/or a pressure belt.

A preheating device (not shown) with preheating rollers is preferably arranged downstream of the inkjet printing device 18 and the at least one device for producing a corrugated cardboard web laminated on one side. The preheating device is part of the corrugator. Each at least one corrugated cardboard web laminated on one side and the endless material web 10 then each wrap around a preheating roller, as a result of which they are heated.

A gluing unit (not shown) of the corrugator is arranged downstream of the preheating device, where glue is applied, in particular in a dosed manner, to each corrugated web of the at least one corrugated cardboard web laminated on one side.

Downstream of the gluing unit, a heating-pressing device (not shown) of the corrugator is arranged, which forms a device for producing a corrugated cardboard web laminated on both sides. The heating-pressing device comprises a horizontal heating table with heating elements and a pressure belt, which is guided around guide rollers and forms a pressure gap with the heating table. The at least one glued corrugated cardboard web laminated on one side and the endless material web 10 are guided through the pressure gap. The at least one glued corrugated cardboard web laminated on one side and the endless material web 10 are pressed together there, forming an endless corrugated cardboard web laminated on both sides. The endless material web 10 advantageously forms a laminating web. The corrugated cardboard web laminated on both sides is printed on the outside.

A slitting/creasing device (not shown) for slitting and creasing the corrugated cardboard web laminated on both sides is arranged downstream of the heating-pressing device. The slitting/creasing device is part of the corrugator.

The slitting/creasing device is followed by a cross-cutting device (not shown) for cross-cutting the corrugated cardboard web laminated on both sides into corrugated cardboard sheets. The cross-cutting device is part of the corrugator.

Between the heating-pressing device and the slitting/creasing device, the corrugator has, for example, a short cross-cutting device (not shown), which is capable of producing a cut that extends over the entire width of the corrugated cardboard web laminated on both sides. Furthermore, it is capable of producing a cut with a certain length and a distance from at least one longitudinal edge of the corrugated cardboard web laminated on both sides. Alternatively, the short cross-cutting device can be positioned differently.

An edge cutting device 22 is arranged between the pre-coating drying device 17 and the inkjet printing device 18, which edge cutting device 22 is assigned to the endless material web 10 and is capable of cutting same in its transport direction 11, i.e. in a longitudinal direction. The edge cutting device 22 is arranged above the inkjet printing device 18 and, in particular, adjacent thereto. It is arranged in the digital printing arrangement.

As FIGS. 2 to 5 also illustrate, the edge cutting device 22 comprises a cross member 23 which extends horizontally and perpendicularly to the transport direction 11, preferably above or below the endless material web 10. The cross member 23 is supported, for example, against the ground 9 or the inkjet printing device 18, in particular against its housing. It is favorably rail-like. The endless material web 10 runs horizontally in the region of the edge cutting device 22.

The edge cutting device 22 also comprises two separately configured edge cutting apparatuses 24, which are guided on the cross member 23 along the same, i.e. perpendicular to the transport direction 11 of the endless material web 10, or in a displaceable manner in a width or transverse direction of the endless material web 10. The edge cutting apparatuses 24 can be displaced individually or together. Each edge cutting apparatus 24 is connected or connectable to a corresponding adjustment means, such as a motor, drive, spindle, handwheel or the like.

Each edge cutting apparatus 24 has a base body 25. Furthermore, each edge cutting apparatus 24 has an upper circular knife 26 and a counter body 27 arranged below the latter. The circular knife 26 and the counter body 27 of each edge cutting apparatus 24 are arranged in pairs at the associated base body 25, forming a cutting gap, and are displaceable relative to one another, for example in a vertical direction, or their distance from one another can be adjusted. It is expedient if the circular knife 26 and the counter body 27 of each edge cutting apparatus 24 is/are rotatably mounted. Favorably, at least the circular knife 26 can be driven in rotation, such as by a drive, motor or the like. The circular knife 26 and the counter body 27 of each edge cutting apparatus 24 are favorably rotatable about axes of rotation which extend horizontally and preferably parallel to one another.

Each base body 25 holds a slide-like coupling part 28, which engages in guide grooves 29 arranged one above the other in the cross member 23. The guide grooves 29 extend along the cross member 23 and are at a constant vertical distance from each other. They run horizontally. The base body 25/coupling parts 28 and the cross member 23 form a linear guide.

The endless material web 10 is guided between the circular knives 26 and the associated counter bodies 27 during use. It is guided through each cutting gap. Each circular knife 26 is capable of engaging in a cutting manner into the endless material web 10 at the edges during its transport and penetrating it completely. For example, it is capable of cutting off a longitudinal edge strip 30, for example an endless strip, with a constant width perpendicular to the transport direction 11. The endless material web 10 is thus cut at the edge E, if necessary, wherein the circular knives 26 then reduce the width of the endless material web 10 perpendicular to the transport direction 11. Favorably, the axes of the circular knives 26 are aligned with each other or run parallel to each other during operation. Each edge cutting apparatus 24 is designed as a slitting apparatus, which is capable of cutting the endless material web 10 at a distance from, but adjacent to, its respective longitudinal material web edge running parallel to the transport direction 11. New longitudinal edges are thus produced on the endless material web 10.

A first material web detection apparatus 31 is arranged between the precoating drying device 17 and the edge cutting device 22, which first material web detection apparatus 31 is associated with the endless material web 10. The first material web detection apparatus 31 is thus arranged upstream of the edge cutting device 22.

A second material web detection apparatus 32 is arranged between the edge cutting device 22 and the inkjet printing device 18, which second material web detection apparatus 32 is associated with the endless material web 10. The second material web detection apparatus 32 is thus arranged downstream of the edge cutting device 22.

Each material web detection apparatus 31, 32 is capable of detecting the endless material web 10. The material web detection apparatuses 31, 32 are part of a material web detection arrangement which detects the endless material web 10 at least from its printing side or pre-coating side or from both sides.

Each material web detection apparatus 31, 32 is preferably capable of detecting opposite material web longitudinal edge regions of the endless material web 10 which extend in the transport direction 11 of the endless material web 10 and which adjoin the material web longitudinal edges. In particular, the material web detection apparatuses 31, 32 can be used to detect the positions or locations of the material web longitudinal edges and a surface condition of the endless material web 10, for example over its entire width or in the material web longitudinal edge regions, as well as at least one degree of shrinkage of the endless material web 10. The material web detection apparatuses 31, 32 are designed accordingly for this purpose.

Each material web detection apparatus 31, 32 is at least temporarily in signal communication with an evaluation unit 33. The evaluation unit 33 is able to receive corresponding electrical signals from the material web detection apparatuses 31, 32, which relate to or characterize the endless material web 10. It evaluates the received signals.

The edge cutting device 22 and the evaluation unit 33 are at least temporarily in signal connection with an actuation arrangement 34.

During operation, the first material web detection apparatus 31 detects the actual state of the endless material web 10 to be cut, in particular at least in the region of the (old/original) longitudinal edges of the endless material web 10. The actual state includes position information of the longitudinal edges of the endless material web 10, surface properties and/or at least one degree of shrinkage of the endless material web 10. The corresponding information is transmitted to the actuation arrangement 34 via the evaluation unit 33. The actuation arrangement 34 specifies cutting parameters to the edge cutting device 22 on the basis of the information received. The edge cutting apparatuses 24 are actuated accordingly. The actuation arrangement 34 also considers damage or defects in the endless material web 10 which are irremovable but which are capable of jeopardizing the print head apparatus 20 or causing further damage to the endless material web 10. Positions of irremovable damage are passed on to the inkjet printing device 18, in particular to its controller, which may allow empty print planning and/or lifting off of the print head apparatus 20 in order to avoid the damage described.

The second material web detection apparatus 32 arranged downstream of the first material web detection apparatus 31 detects the actual state of the already cut endless material web 10 during operation, in particular at least in the region of the new longitudinal edges of the endless material web 10. The actual state includes position information of the new longitudinal edges of the endless material web 10, surface properties and/or at least one degree of shrinkage of the endless material web 10. The corresponding information is transmitted to the actuation arrangement 34 via the evaluation unit 33. If necessary, the cutting parameters of the edge cutting device 22 are post-corrected and the edge cutting apparatuses 24 are actuated accordingly. The actuation arrangement 34 preferably has a post-correction unit for this purpose. A post-correction is preferably carried out if the detected actual state is outside a tolerance range. The second material web detection apparatus 32 also permits checking and/or new detection of damage that is irremovable but is capable of jeopardizing the print head apparatus 20 or causing further damage to the endless material web 10. The positions of any irremovable damage are passed back to the inkjet printing device 18, in particular to its controller, which may allow empty printing to be planned and/or the print head apparatus 20 to be lifted off.

The edge cutting device 22 is assembled in such a manner that the transport path of the endless material web 10 to the inkjet printing device 18, in particular to the print head apparatus 20, is as large as possible. If damage or an error is detected or analyzed on the endless material web 10, there is sufficient time to lift the print head apparatus 20 off and thus avoid damaging it or the endless material web 10. Furthermore, there is sufficient time to create an empty print planning on the system side. The actuation arrangement 34 is at least temporarily in signal communication with the inkjet printing device 18 for this purpose.

For example, the circular knives 26 are adjustable in the width direction of the endless material web 10 when they are out of engagement with the endless material web 10.

A second embodiment is described below with reference to FIGS. 6, 7. Identical parts are given the same reference signs as in the previous embodiment, the description of which is hereby referred to. Structurally different but functionally similar parts are given the same reference signs with a trailing "a".

In comparison with the previous embodiment, two further, i.e. third, material web detection apparatuses 35 are arranged at the base frame support 8. A further material web detection apparatus 35 is associated with each material web roll 2, 4. Each further material web detection apparatus 35 is capable of detecting an end face of the respective material web roll 2 or 4 from above. This end face is favorably the end face on which the material web roll 2 or 4 has been placed, for example during storage or transport. Each further material web detection apparatus 35 is at least temporarily in signal communication with the evaluation unit 33*a*. Alternatively, all end faces are detected.

Each circular knife 26 and each associated counter body 27 are also pivotable, in particular in a controlled manner, about a pivot axis, in particular a vertical one. At least one actuating unit, such as an actuating drive, servo-motor or the like (not shown), is assigned to each circular knife 26 and each associated counter body 27 for this purpose. Each actuating unit is at least temporarily in signal connection with the actuation arrangement 34*a*.

In comparison with the previous embodiment, a material web run correction arrangement 36 is also provided, which is arranged between the edge cutting device 22*a* and the print head apparatus 20 and is capable of correcting a run of the endless material web 10*a*, if necessary. In particular, the material web run correction arrangement 36 is capable of influencing a run of the endless material web 10*a* or causing a transverse deflection thereof. The endless material web 10*a* can thus be aligned towards the print head apparatus 20 or towards the center.

The material web run correction arrangement 36 comprises a material web run correction apparatus 37, which is designed, for example, as a rotating frame and preferably has at least one upper roller and lower roller for, preferably Z-shaped, wrapping by the endless material web 10*a*. The rollers run parallel to each other and preferably at different heights. They are rotatably mounted.

In an undeflected basic position of the rotating frame, the rollers run horizontally and one above the other. There is then no lateral deflection of the endless material web 10*a*.

The rotating frame pivotable, for example by an actuator arrangement or a drive of the material web run correction arrangement 36, in order to deflect the endless material web 10*a* laterally or to change its course. For this purpose, it is pivotable in its entirety about a horizontal pivot axis, which is located between the upper roller and the lower roller. It is thus possible to correct the position or course of the endless web 10*a* without applying an additional tensile force to one side of the endless web 10*a*. The actuator arrangement rotates the rotating frame as a whole in a vertical plane. In a deflected or pivoted position of the rotating frame compared to the basic position, the rollers run parallel to each other, but at an angle to a horizontal or vertical plane.

Furthermore, the material web run correction arrangement 36 has a material web run detection apparatus 38, which is capable of detecting the endless material web 10*a*, in particular at least one (new) longitudinal edge thereof. The material web run detection apparatus 38 is arranged downstream of the material web run correction apparatus 37. It is arranged upstream of the print head apparatus 20.

The material web run correction arrangement 36 also has a material web run actuation unit 39, which is at least temporarily in signal connection with the material web run correction apparatus 37 and the material web run detecting apparatus 38. The material web run actuation unit 39 is also at least temporarily in signal connection with the actuation arrangement 34*a*.

Operation is basically the same as in the first embodiment.

Each further material web detection apparatus 35 detects the end face of the material web roll 2 or 4 held in the respective unwinding unit 3, 5 in order to detect pressure marks there. In doing so, the detected material web roll 2 or 4 can rotate about the unwinding axis.

Corresponding signals are fed to the actuation arrangement 34*a* via the evaluation unit 33*a*. The actuation arrangement 34*a* controls the relevant edge cutting apparatus 24*a* accordingly. It may only be necessary to cut the endless material web 10*a* on one side.

The second material web detection apparatus 32 again (also) detects the actual position of at least one new longitudinal edge of the endless material web 10*a*.

The actual position of the at least one cut longitudinal edge is transmitted via the actuation arrangement 34*a* to the material web run actuation unit 39, which, if necessary, actuates the material web run correction apparatus 37 in such a manner that the endless material web 10*a* is aligned accordingly.

The material web run detection apparatus 38 detects at least one new longitudinal edge of the endless material web 10*a* after it has passed through the material web run correction apparatus 37. An actual position of the at least one new longitudinal edge of the endless material web 10*a* after the material web run detection apparatus 38 is thus detected. The material web run detection apparatus 38 sends a corresponding feedback to the material web run actuation unit 39. If necessary, the run of the endless material web 10*a* is post-corrected.

Damage to the inkjet printing device 18 or the endless material web 10*a* can thus be avoided particularly reliably.

Each edge cutting apparatus 24*a* is capable of producing a longitudinal edge strip 30 with a constant width. Finite material webs of identical width can be used.

Figure 7:
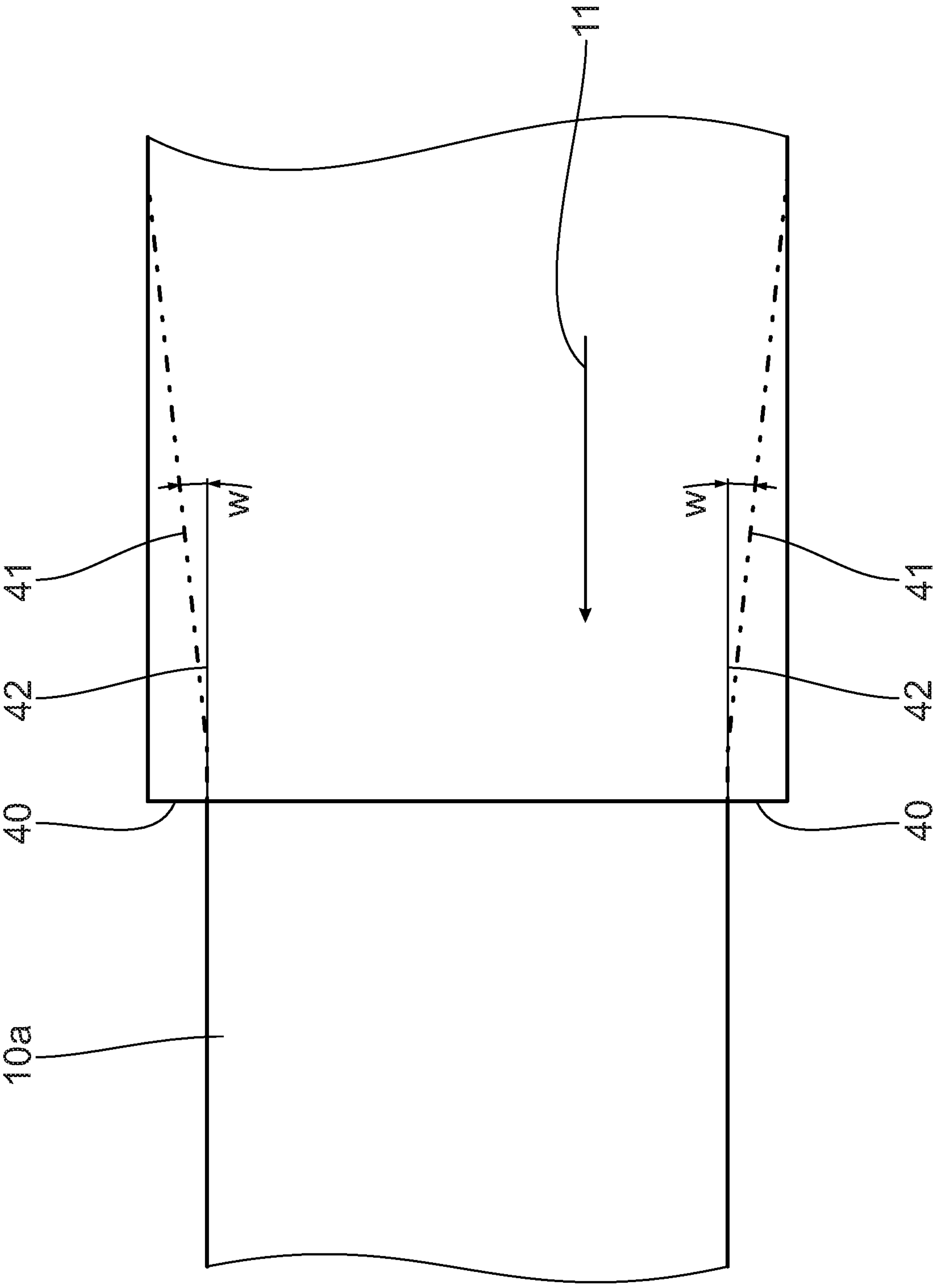
FIG. 7 shows a plan view onto the material web after a width change.

FIG. 7 shows a width change of the endless material web 10*a*, which can also be carried out in this embodiment. Endless material webs with different widths can be joined together by the material web delivery device 1 to form the endless material web 10*a*. As FIG. 7 further illustrates, when the width is changed, there is conventionally a leading edge 40 on the new finite material web, which leading edge 40 extends perpendicular to the transport direction 11 of the endless material web 10*a* and protrudes laterally outwards in relation to the old/former finite material web. The new finite material web is wider than the old finite material web. It has been recognized that such a lateral abutting edge 40 often results in damage to the inkjet printing device 18 and/or the endless material web 10*a*, in particular if it protrudes towards the print head apparatus 20 with respect to the plane of the endless material web 10*a*. The old finite material web is formed, for example, by the finite first material web, while the new finite material web is then formed by the second material web. A reverse formation is alternatively possible.

By pivoting the respective circular knife 26 and counter body 27 about the corresponding pivot axis, which extends there perpendicularly to a plane of the endless material web 10*a*, an inclined cut can be produced in the endless material web 10*a*, which permits a smooth transition between the finite material webs of different widths and prevents damage to the endless material web 10*a* or inkjet printing device 18. Each edge cutting apparatus 24*a* is actuated in such a manner that an inclined cutting line 41 is formed in the endless material web 10*a* relative to the transport direction 11. A wedge-shaped cut is thus made by each edge cutting apparatus 24*a*. Favorably, each edge cutting apparatus 24*a* forms an angle w of between 0° and 45° with a line 42 parallel to the transport direction 11. When the inclined cutting line 41 is produced, the corresponding circular knife 26 or its axis of rotation is correspondingly inclined to the transport direction 11 and width direction of the endless material web 10*a*. The axes of rotation of the circular knives 26 then also run at an angle to each other. Preferably, the longitudinal edge strips 30 have an identical width after the width change. During the width change, the longitudinal edge strips 30 have a changing width. After the width change according to FIG. 7, the endless material web 10*a* is wider than before. There is a symmetrical, even transition of the endless material web 10*a* from "narrow" to "wide". Alternatively, a reverse width change is possible.

The actuation arrangement 34*a* transmits at least one position and length of the respective inclined or wedge-shaped cut 41 to a controller of the inkjet printing device 18. The endless material web 10*a* is then not printed on or only partially printed on over the length of the inclined cut 41, which depends on the respective print job.

Figure 8:
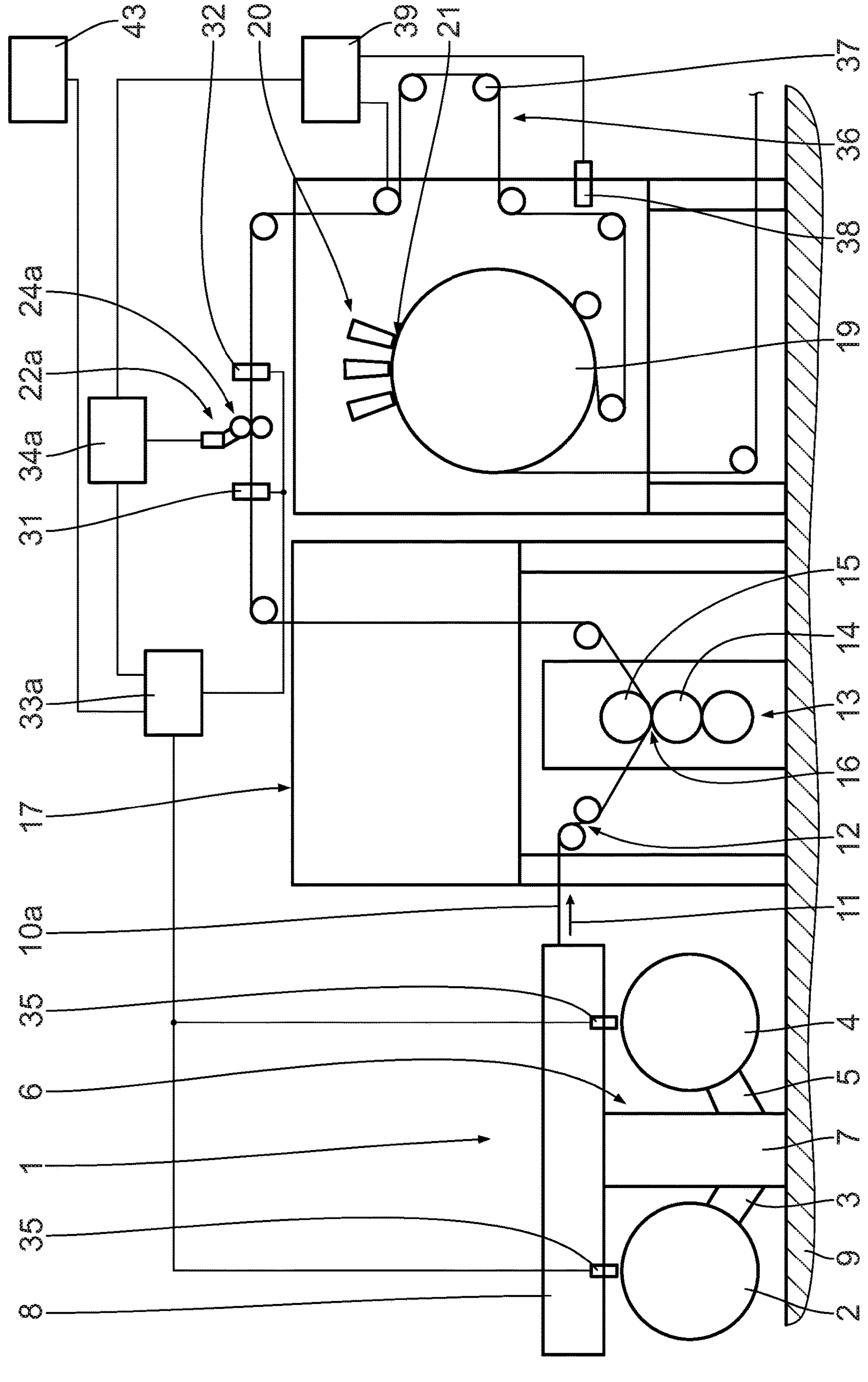
FIG. 8 shows a schematic view of an arrangement according to the invention, in particular a printing arrangement, together with a material web according to a further embodiment.

A third embodiment is described below with reference to FIG. 8. Identical parts are given the same reference signs as in the embodiment according to FIG. 6, the description of which is hereby referred to. In this embodiment, the corrugator or a corrugator actuation arrangement 43 is included. For this purpose, a cutting list of the corrugator or corrugated cardboard production, which originates in particular from an (order) control system of the corrugator, is transmitted to the actuation arrangement 34*a*. The endless material web 10*a* is pre-cut by the edge cutting device 22*a*, in particular by at least one edge cutting apparatus 24*a*, to a corresponding nominal width, for example also with a corresponding overhang of between 30 mm and 40 mm.

At least one position and length of blank prints is transmitted to the corrugator actuation arrangement 43. In this manner, an automatic discharge of blank prints and missing parts, preferably via the short cross-cutting device and/or at least one cross-cutting device of the corrugator, is possible. The corrugator actuation arrangement 43 is at least temporarily in signal communication with the evaluation unit 33*a* and/or the inkjet printing device 18, in particular the controller of the latter.

In the corrugator, the endless material web 10*a* is checked with regard to the cutting pattern and print image. A corresponding target/actual comparison is carried out upstream of the device for producing a corrugated cardboard web laminated on both sides and, favorably, adjacent to it. A corresponding target/actual comparison is also carried out downstream of the device for producing a corrugated cardboard web laminated on both sides and preferably adjacent to it. A corresponding target/actual comparison is also carried out downstream of the slitting/creasing device and preferably adjacent to it. In the event of faulty cuts, a direct post-correction is initiated if necessary. Preferably, feedback to a higher-level control system with a job-specific experience database is also possible.

Such inclusion of the corrugator or corrugator actuation arrangement 43 is also possible in other embodiments.

Figure 9:
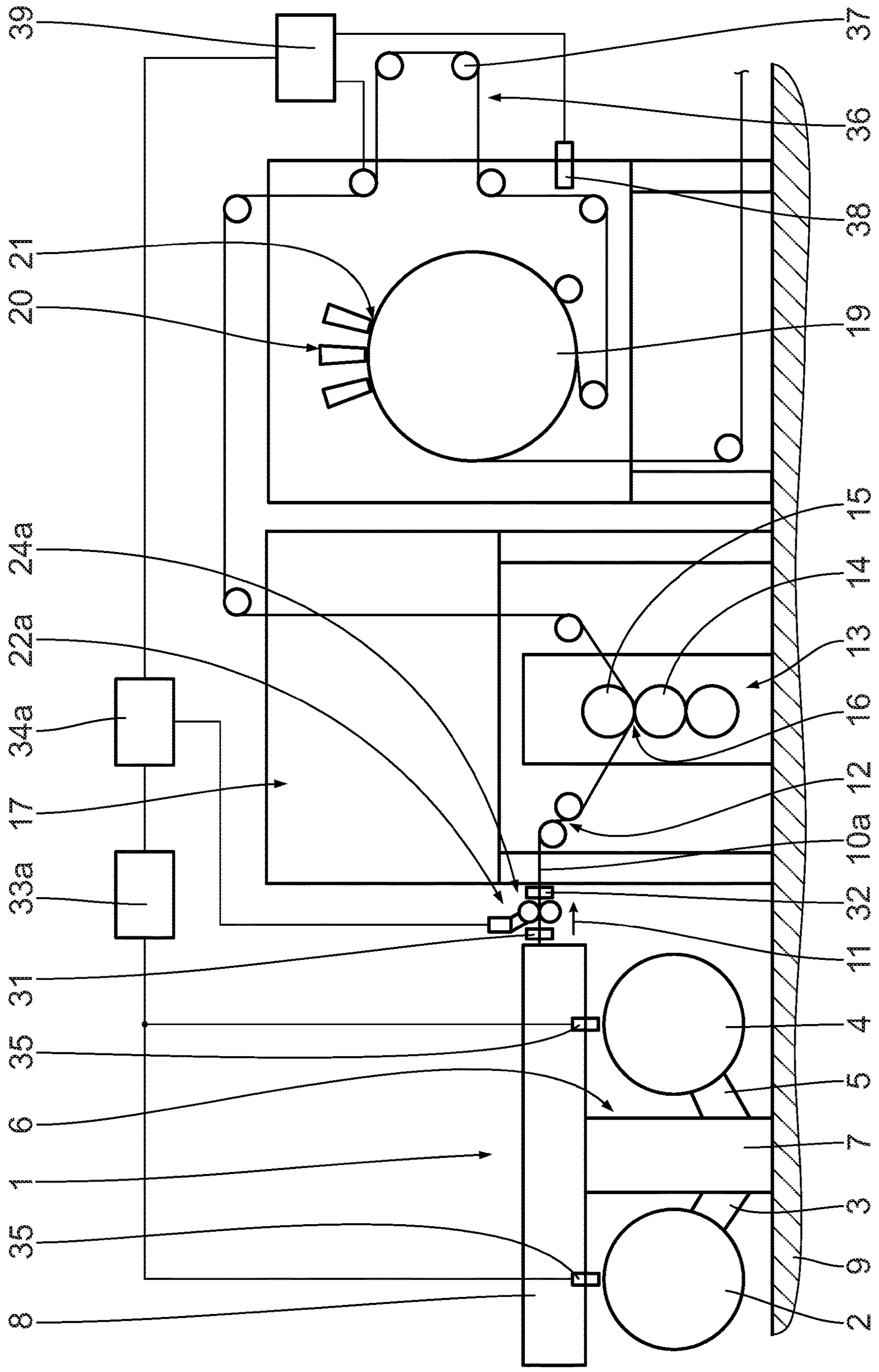
FIG. 9 shows a schematic view of an arrangement according to the invention, in particular a printing arrangement, together with a material web according to a further embodiment.

A fourth embodiment is described below with reference to FIG. 9. Identical parts are given the same reference signs as in the embodiment shown in FIG. 6, the description of which is hereby explicitly referred to.

Figure 6:
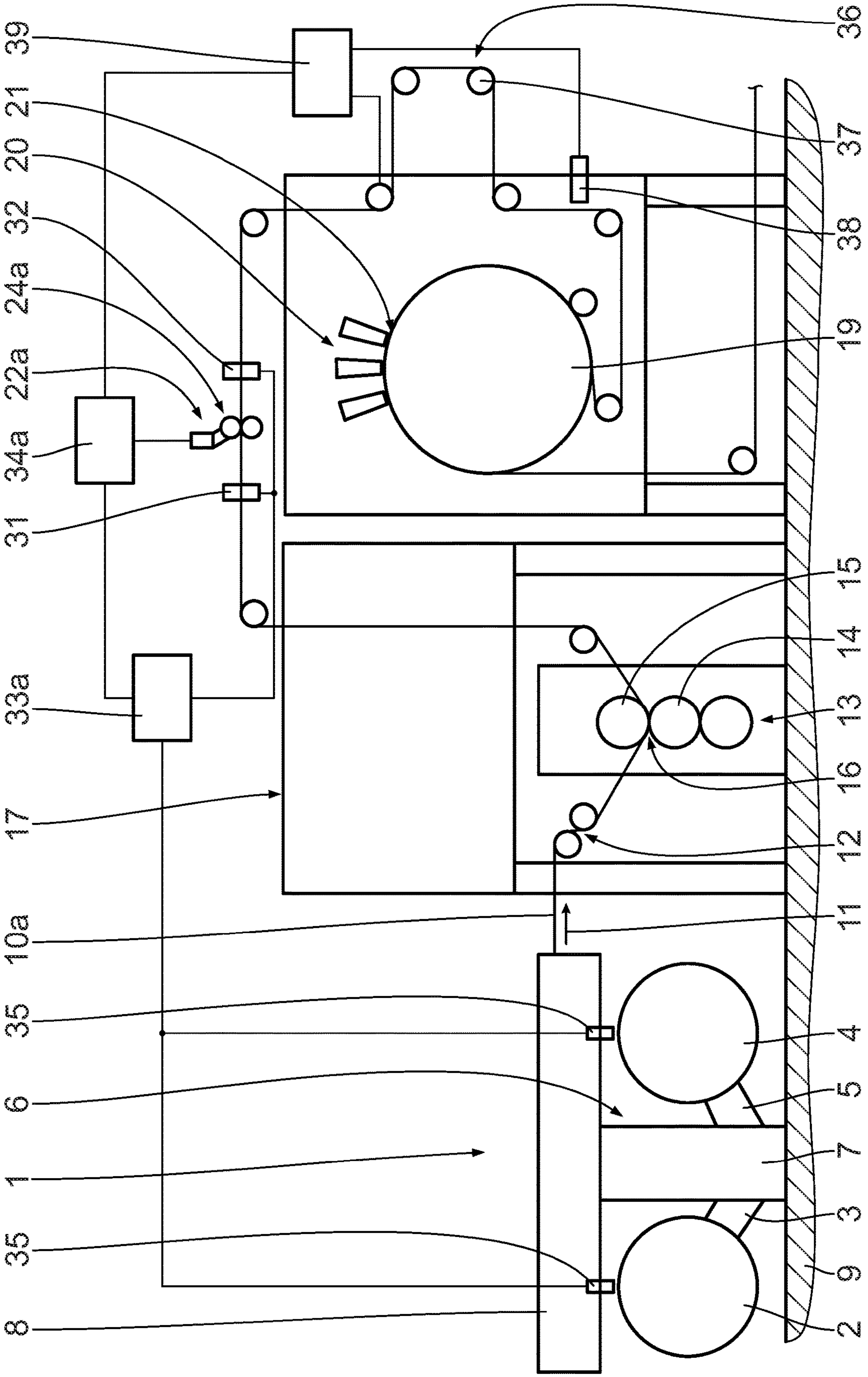
FIG. 6 shows a schematic view of an arrangement according to the invention, in particular a printing arrangement, together with a material web according to a further embodiment.

In comparison with the embodiment according to FIG. 6, the edge cutting device 22*a* is arranged between the material web delivery device 1 and the pre-coating application device 13. The first material web detection apparatus 31 is thus arranged between the edge cutting device 22*a* and the material web unwinding device 1. The second material web detection apparatus 32 is arranged between the edge cutting device 22*a* and the pre-coating application device 13. Experience has shown that no protruding or elevated edges or edge regions are produced on the endless material web 10*a* after it leaves the material web delivery device 1. The edge cutting device 22*a* is thus arranged directly adjacent to the material web delivery device 1. The inkjet printing arrangement 18 can thus be particularly compact. Defects or faults can already be removed prior to the pre-coating application device 13. Alternatively, a design without a material web run correction arrangement 36 is possible. Alternatively, a design without third material web detection apparatuses 35 is possible.

Figure 10:
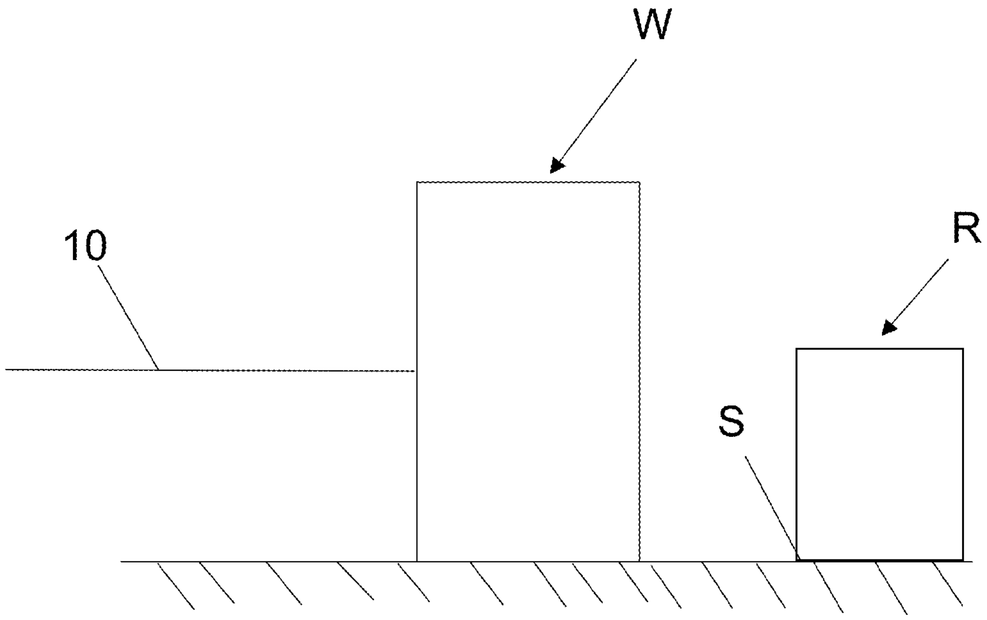
FIG. 10 shows a schematic view of a winding device, a standing roll, and a material web roll standing surface.

FIG. 10 schematically shows a winding device W, a standing roll R, and a material web roll standing surface S.

The signal connections specified here are, for example, configured to be wireless or wired.

Combinations of individual embodiments are possible.

The invention claimed is:

1. An assembly comprising:

a material web delivery device for delivering a material web;

an edge cutting device, which is arranged downstream of the material web delivery device in a transport direction of the material web and has at least one edge cutting apparatus for edge-cutting the material web;

a digital printing device, which is arranged downstream of the edge cutting device in the transport direction of the material web for printing on the material web; and a material web run correction arrangement arranged downstream of the edge cutting device in the transport direction of the material web for correcting a run of the material web, wherein the material web run correction arrangement has at least one material web run detection apparatus and at least one material web run correction apparatus which is at least temporarily in signal connection with said material web run detection apparatus.

2. The assembly according to claim 1, wherein the edge cutting device is capable of producing a cut which, with a line parallel to the transport direction of the material web, encloses an angle which is between 0° and 45°.

3. The assembly according to claim 1, the material web run correction arrangement has a material web run actuating unit which is at least temporarily in signal connection with the at least one material web run detection apparatus and material web run correction apparatus.

4. The assembly according to claim 1, further comprising a material web detection arrangement with at least one material web detection apparatus for detecting the material web.

5. The assembly according to claim 4, wherein at least one material web detection apparatus is capable of detecting at least one edge region of the material web.

6. The assembly according to claim 4, wherein at least one material web detection apparatus is configured to detect a surface condition of the material web at least in some regions.

7. The assembly according to claim 4, wherein at least one material web detection apparatus is arranged downstream of the edge cutting device in the transport direction of the material web.

8. The assembly according to claim 4, further comprising at least one material web roll apparatus for storing at least one material web roll carrying the material web, wherein at least one material web detection apparatus of the at least one material web detection apparatus for detecting the rolled-up material web is associated with the at least one mate-rial web roll apparatus.

9. The assembly according to claim 4, wherein at least one material web detection apparatus is arranged upstream of the edge cutting device in the transport direction of the material web.

10. The assembly according to claim 8, wherein the at least one material web detection apparatus is configured to detect at least one end face of the at least one material web roll.

11. The assembly according to claim 4, further comprising an actuation arrangement which is at least temporarily in signal connection with the edge cutting device for actuating the edge cutting device, wherein the at least one material web detection apparatus is at least temporarily in signal connection with the actuation arrangement, the actuation arrangement being configured as a control and/or regulation arrangement.

12. The assembly according to claim 4, wherein the material web detection arrangement is at least temporarily in signal connection with an evaluation unit.

13. The assembly according to claim 1, further comprising an actuation arrangement which is at least temporarily in signal connection with the edge cutting device for actuating the edge cutting device, the actuation arrangement being configured as a control and/or regulation arrangement.

14. The assembly according to claim 13, wherein the actuation arrangement receives a cutting list during operation, the cutting list containing at least one piece of cutting information, wherein the edge cutting device is configured for pre-cutting the material web to a width corresponding to the cutting list.

15. The assembly according to claim 14, wherein the actuation arrangement receives a cutting list for producing the corrugated cardboard.

16. The assembly according to claim 14, wherein the edge cutting device is configured to pre-cut the material web to a width corresponding to the cutting list.

17. The assembly according to claim 14, wherein the edge cutting device is configured to pre-cut the material web with an overhang.

18. The assembly according to claim 14, wherein the edge cutting device is configured to pre-cut the material web taking into account a shrinkage of the material web.

19. The assembly according to claim 1, further comprising a material web winding device for winding up the material web cut at at least one edge, wherein the material web is windable by the material web winding device to form a material web roll, even with different widths over its longitudinal extent, in such a manner that a material web edge of the material web, extends at an end face of the material web roll and forms a material web roll standing surface.

20. The assembly according to claim 19, wherein the material web edge of the material web is aligned at the end face of the material web roll, forming a material web roll standing surface.

21. An assembly comprising:

a material web delivery device for delivering a material web;

an edge cutting device, which is arranged downstream of the material web delivery device in a transport direction of the material web and has at least one edge cutting apparatus for edge-cutting the material web;

a digital printing device, which is arranged downstream of the edge cutting device in the transport direction of the material web for printing on the material web; and a material web winding device for winding up the material web cut at at least one edge, wherein the material web is windable by the material web winding device to form a material web roll, even with different widths over its longitudinal extent, in such a manner that a material web edge of the material web extends at an end face of the material web roll and forms a material web roll standing surface, wherein the material web roll standing surface allows the material web roll to be placed in a stable position, the material web roll standing surface forming a standing plane which extends perpendicular to a longitudinal axis of the material web roll.

* * * * *